United States Patent [19]

Stagg et al.

[11] Patent Number: 4,877,671
[45] Date of Patent: Oct. 31, 1989

[54] REDUCING SHRINKAGE OF PHENOLIC FOAM COMPOSITES

[75] Inventors: Malcolm J. Stagg, Beaconsfield; Eric P. Stern, Montreal; Sunil Vidyarthi, Beaconsfield, all of Canada

[73] Assignee: BPCO, Inc., Canada

[21] Appl. No.: 165,747

[22] Filed: Mar. 9, 1988

[30] Foreign Application Priority Data

Mar. 13, 1987 [CA] Canada ............................. 532,006

[51] Int. Cl.⁴ .............................................. B32B 3/10
[52] U.S. Cl. ................................. 428/139; 428/159; 428/178; 428/182; 428/184; 428/186; 428/309.9; 428/317.5; 156/79
[58] Field of Search ............... 428/139, 159, 178, 182, 428/184, 186, 309.9, 317.5; 156/79

[56] References Cited

U.S. PATENT DOCUMENTS

| 2,369,658 | 2/1945 | Burns | 428/161 |
|---|---|---|---|
| 3,228,820 | 1/1966 | Samson | 156/307.3 |
| 3,274,046 | 9/1966 | Shannon et al. | 428/86 |
| 3,467,569 | 9/1969 | Weber et al. | 428/317.7 |
| 3,931,429 | 1/1976 | Austin | 428/158 |
| 4,020,207 | 4/1977 | Alfter et al. | 428/138 |
| 4,091,142 | 5/1978 | Elmore et al. | 428/309.9 |
| 4,150,850 | 4/1979 | Doerfling | 428/309.9 |
| 4,358,498 | 11/1982 | Chavannes | 428/184 |
| 4,425,396 | 1/1984 | Hartman | 428/220 |
| 4,476,183 | 10/1984 | Holtrop et al. | 428/286 |
| 4,500,596 | 2/1985 | Lee | 428/317.5 |

Primary Examiner—William J. Van Balen
Attorney, Agent, or Firm—Silverman, Cass, Singer & Winburn

[57] ABSTRACT

A foam composite - especially useful as an insulating board - comprising first and second oppositely disposed corrugated skins having a core of foam material therebetween, and a reinforcement medium located at the interface between the foam core and each skin, the foam extending through interstices or pores in the medium and bonding to the medium and to the skins. The reinforced composite so formed has increased resistance to bending and other deformations and improved dimensional stability.

37 Claims, 2 Drawing Sheets

REDUCING SHRINKAGE OF PHENOLIC FOAM COMPOSITES

This invention relates to foam composites and specifically to a method of mechanically reinforcing same. In the case of closed cell phenolic foam composites, the invention is especially effective to reduce shrinkage during storage of such composites.

One object of the present invention is to provide a method of reinforceing foam composites in general in order to increase the mechanical strength of such composites and provide increased resistance to bending an other deformations.

Considering the case of closed cell phenolic foams, some of these have an excessive tendency to shrink after manufacture. Even when these foams are incorporated into insulating boards by sandwiching the foam between corrugated kraft paper skins, shrinkage can occur. The shrinkage at room temperature can be as much as 2% over periods as extensive as two months, before the panel achieves an equilibrium between the shrinkage forces of the foam and the restraining force of the kraft paper. Especially in the "machine" direction of the corrugated board manufacturing process - that is in the direction transverse of the kraft paper corrugations - the kraft paper offers little resistance to shrinkage of the foam. Therefore, the shrinkage of the boards in the machine direction is significantly larger than in the "cross machine" direction (along the corrugations).

It is one object of the present invention, therefore, to reinforce the skin of a closed cell phenolic foam composite in order to resist shrinkage of the foam. It may be noted that one method of restraining shrinkage of the foam in such a composite is to provide perforations in the kraft paper, through which the foam passes and effectively keys itself to the paper. However, the filling of the corrugations with phenolic resin through the perforations happens in a random fashion and, as a result, the shrinkage values in the machine direction show a much larger variability that in the cross-machine direction.

According to the present invention, we provide a porous reinforcement medium at the interface between the foam and the respective skins. This medium may be in the form of a particulate medium, such as sawdust, or a continuous porous mat of, for example, low density flexible urethane foam or a wadding paper, which is a low density dry formed cellulosic material.

In the case where the material is a porous mat or wadding paper, the foam is forced during the manufacturing process through the pores of the material. The catalysed resin penetrating these pores assures the bond between the consecutive layers of foam, reinforcement material and corrugated skin. The resin also reinforces the material due to its increased density. Similarly, where a particulate or fibrous material such as sawdust or chopped fibreglass is used, the foam surrounds and embeds the particles and a reinforcement region is formed at the foam/skin interface. Where the skin is kraft paper, for example, the in-plane compression modulus of the skin composite formed of singe face corrugated board and resin saturated reinforcement material is significantly higher than the modulus of the reinforced kraft paper single face skin before application of the foam. The increased thickness of the composite skin also serves to increase the stiffness of the composite board skin and (in the case of closed cell phenolic foam composites) reduce its tendency to buckle and therefore shrink as a result of the compression forces induced by the shrinking closed cell foam. Thus, the presence of the continuous or particulate material adjacent the kraft skin results in a reinforcement of the kraft paper and resistance both to shrinkage of the foam and buckling of the paper.

The invention will now be described further, by way of example only, with reference to the accompanying drawings, wherein.

Figure 1:
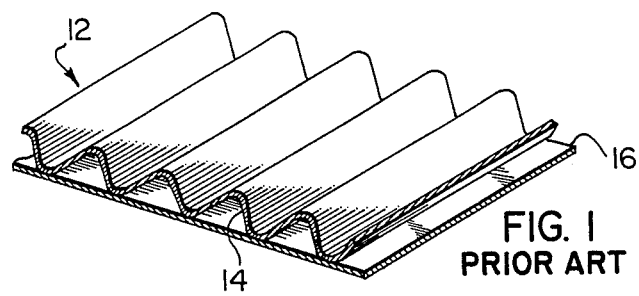
FIG. 1 illustrates a conventional protective kraft paper skin for use in a heat insulating panel.

Referring now to the drawings, there is shown in FIG. 1 a protective kraft paper skin 12 used in forming a conventional composite heat insulating board or panel in accordance with the present invention. The protective skin 12 comprises a single faced corrugated kraft paper board structure having a corrugated paper board medium 14 and an outer liner 16 adhered to the crest portions of the corrugated medium with a suitable adhesive, such as for example a wet strength adhesive.

Figure 2:
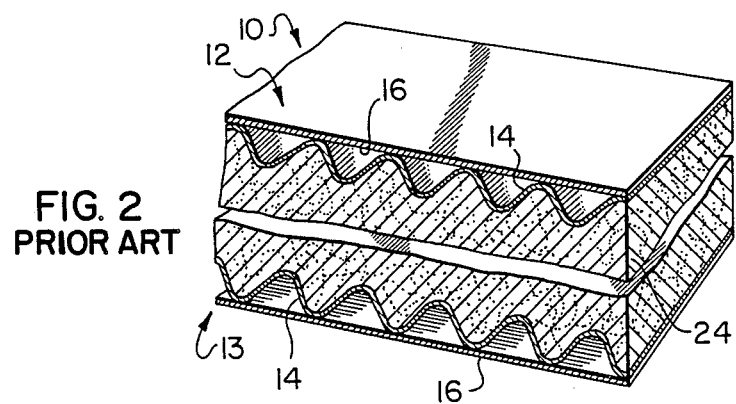
FIG. 2 illustrates a conventional heat insulating panel utilizing the protective skin of FIG. 1.

There is shown in FIG. 2 a conventional heat insulating panel 10 which utilizes the protective skin 12. The panel 10 comprises upper and lower protective skins 12, 13 having a core 24 of foam material therebetween which, by itself, is somewhat unstable dimensionally.

As discussed above, the some foams tend to shrink after manufacture and eventually reach an equilibrium between the shrinkage forces and the restraining force of the skin. It will be apparent that the corrugated structure has considerably more stiffness in the direction parallel to the corrugations than it does across the corrugations. This means that the shrinkage is significantly larger across the corrugations—i.e. in the "machine" direction—than it is in the "cross-machine" direction.

Figure 3:
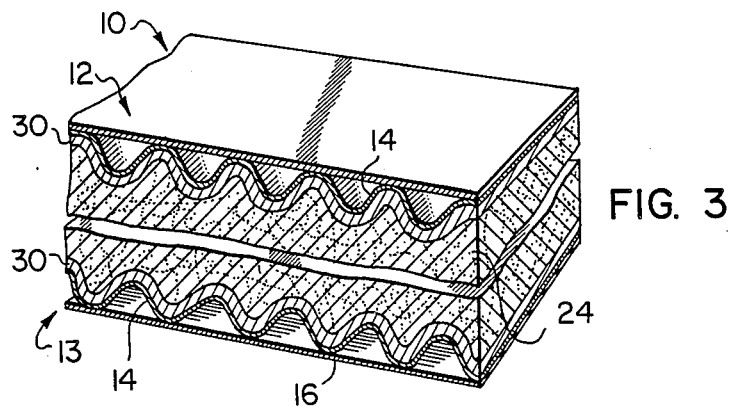
FIG. 3 is an enlarged cross-sectional elevation of a foam composite in the form of an insulating panel similar to that shown in FIG. 2 but incorporating the improvement according to one embodiment of the present invention.

As illustrated by FIG. 3, in order to provide reinforcement in both directions—and thus provide uniformity of restraint to the shrinkage of the foam—a porous layer 30 is provided at the interface between the paper board medium 14 and the foam 24. The layer 30 may be in the form of a fibrous material, such as sawdust, in which case a typical thickness of the layer would be about 2 mm. Alternatively, the layer may be in the form of a continuous medium, such as very low density flexible urethane foam or a wadding paper. In the case of a urethane foam layer, a typical thickness would be about 2 mm. For a wadding paper layer, a typical thickness would be about 1 mm.

During the manufacturing process, the phenolic foam 24 is sandwiched between the skins 12 and 13—which have the layers 30 pre-applied thereto—and is cured.

The raising phenolic foam is forced through the pores of the layers 30 (or between the fibres, where the layer is a fibrous material). The catalysed resin assures the bond between the consecutive layers of foam 24, layer 30 and corrugated skin 12 or 13. Equally importantly, the resin-impregnated layer 30 provides a region of reinforcement at the interface between the foam core 24 and the skin 12 or 13, which greatly increases the restraining forces against shrinkage of the foam and ensures that any shrinkage which does take place is substantially uniform in the machine and cross-machine directions of the panel.

Figure 4:
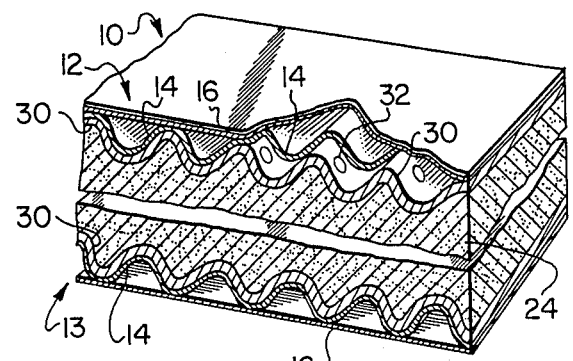
FIG. 4 is a cut-away view of a panel similar to that of FIG. 3 but illustrating further embodiments of the invention.

FIG. 4 illustrates a further embodiment of the invention, wherein through-holes 32 are provided in the layers 30. In this drawing, the skin 12 is cut away to reveal through-holes 32, which communicate the phenolic foam core 24 with the corrugated layer 14 by providing access of the foam 24 to the surface of layer 14. The foam fills the holes 32 and enhances the adhesion and reinforcement properties noted above by providing a combination of the reinforcement region across the interface between the foam core and each skin and direct keying of the foam to the skins via the holes 32.

Figure 5:
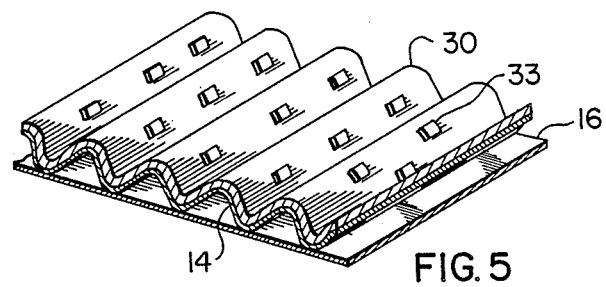
FIG. 5 illustrates a protective skin as shown in FIG. 3, provided with anchor points for enhanced adhesion to the foam core.

FIG. 5 illustrates a further embodiment of the invention, wherein anchor points 33 are provided upon each layers 30. These may be in the form of small pieces of cellulosic felt or Velcro (trade mark) glued to the continuous layer 30. Alternatively the anchor pieces may be formed from perforated bead board, pieces of closed cell phenolic foam or spots of adhesive such as epoxy or catalysed resin. In all of the foregoing, the purpose of the anchor points is to provide locally increased adhesion between the phenolic foam core 24 and the layers 30 and thus further improve the tensile strength of the composite.

Figure 6:
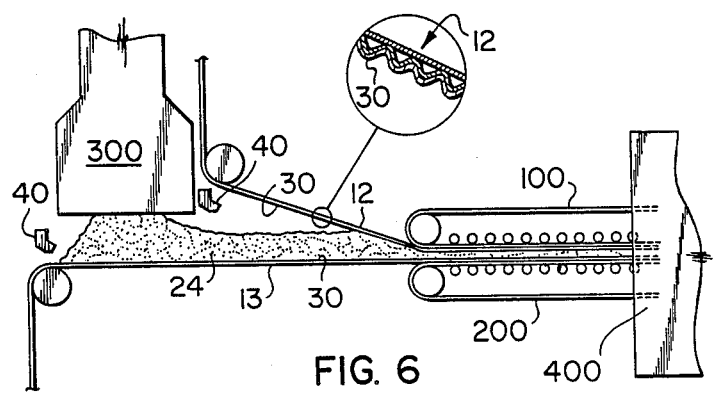
FIG. 6 shows, in schematic form, part of a production line for manufacturing foam composites according to the invention.

FIG. 6 shows, in schematic form, part of a production line for manufacturing foam composites according to the invention. First and second runs of kraft paper 12, 13 are separately fed into the gap between belt conveyors 100, 200, which are spaced apart by the desired width of the composite to be manufactured. Each kraft paper run has a layer 30 of reinforcement material applied thereto in a previous stage (see below) and the layers 30 face each other as they approach the gap between belts 100, 200. Thus, in cross-section, the kraft paper runs (which will form the skins 12 and 13) are as shown in FIGS. 3 and 4.

Foam precursor 24 is introduced into the lower kraft paper run 13 from a dispenser 300 and as the runs transport the foam between the belts 100, 200, the foam is partially compressed and forced through the pores of the medium 30 and into contact with the kraft paper. From the belt conveyors 100, 200, the composite passes into a heating tunnel 400, wherein controlled foaming and curing takes place. Of course, the apparatus illustrated in FIG. 5 is entirely conventional and the invention is thus adaptable to existing entirely conventional and the invention is thus adaptable to existing production lines with minimal modifications required.

The reinforcing medium can be preglued to the interior of the corrugated skins in a step preliminary to the foam laydown process. Alternatively, the mat can be fed together with the corrugated skin through the process. It is also possible to lay down the particulate or fibrous material before the foaming mixture on the bottom skin and/or on top of the foaming mixture to be contacted by the top skin, using such devices as, for example, vibrating troughs 40 located transversely of the mat.

The embodiments of the invention in which an exclusive property or privilege is claimed are defined as follows:

1. A foam composite comprising first and second oppositely disposed corrugates skins and a core of cured foam material between said skins, and a reinforcement medium located at the interface between said foam core and each said skin, said foam extending through interstices or pores in said medium and bonding to said medium and each said skin.

2. A foam composite as defined in claim 1, wherein said skins are corrugated kraft paper.

3. A foam composite as defined in claim 1, wherein said medium is a continuous porous mat or a particulate or fibrous material having interstices between the particles thereof.

4. A foam composite as defined in claim 3, wherein said medium is sawdust.

5. A foam composite as defined in claim 3, wherein said medium is selected from low density urethane foam and wadding paper.

6. A foam composite as defined in claim 1, wherein said medium is a continuous porous mat which is perforated at selected intervals to provide additional communication between said foam and each of said skins.

7. A foam composite as defined in claim 1, wherein said medium is a particulate material layer having a thickness of about 2 mm.

8. A foam composite as defined in claim 1, wherein said medium is a continuous porous mat having a thickness of about 1-2 mm.

9. A foam composite forming an insulating panel, said composite comprising first and second oppositely disposed skins of corrugated kraft paper having inwardly facing corrugations and a core of foam material therebetween, and first and second porous mats of reinforcement material located between said foam core and the respective corrugations of said skins, said foam extending through the pores of each said mat and bonding to said reinforcement material and to the corrugations of each said kraft paper skin.

10. A foam composite forming an insulating panel, said composite comprising first and second oppositely disposed skins of corrugated kraft paper having inwardly facing corrugations and a core of cured foam material therebetween, and first and second layers of particulate material at each interface between said corrugations and said foam, said foam extending between the particles of said material and bonding to said particles and to the corrugations of each said kraft paper skin.

11. A foam composite as claimed in claim 9, wherein each said porous mat is wadding paper or a low density flexible urethane foam.

12. A foam composite as claimed in claim 10, wherein said reinforcement material is sawdust.

13. A foam composite as claimed in claim 11, wherein each said porous mat has a thickness of about 2 mm.

14. A foam composite as claim in claim 12, wherein each said sawdust layer has a thickness of about 2 mm.

15. A foam composite as claimed in claim 9, wherein each said continuous porous mat is perforated at selected intervals to provide additional communication between said foam and each said skin.

16. A foam composite as defined in claim 1, wherein said continuous porous mat is provided on its surface adjacent said foam material with anchor points for said foam, said anchor points being secured to said mat and providing locally increased adhesion between said foam and said mat.

17. A foam composite as defined in claim 16, wherein said anchor points are small pieces of material selected from cellulosic felt, Velcro, perforated beadboard, closed cell phenolic foam and epoxy or catalysed resin adhesive.

18. A phenolic foam composite comprising first and second oppositely disposed corrugated skins and a core of phenolic foam material between said skins, and a reinforcement medium located at the interface between said foam core and each said skin, said foam extending through interstices or pores in said medium and bonding to said medium and each said skin.

19. A phenolic foam composite as defined in claim 18, wherein said skins are corrugated kraft paper.

20. A phenolic foam composite as defined in claim 18, wherein said medium is a continuous porous mat or a particulate or fibrous material having interstices between the particles thereof.

21. A phenolic foam composite as defined in claim 20, wherein said medium is sawdust.

22. A phenolic foam composite as defined in claim 20, wherein said medium is selected from low density urethane foam and wadding paper.

23. A phenolic foam composite as defined in claim 18, wherein said medium is a continuous porous mat which is perforated at selected intervals to provide additional communication between said foam and each of said skins.

24. A phenolic foam composite as defined in claim 18, wherein said medium is a particulate material layer having a thickness of about 2 mm.

25. A phenolic foam composite as defined in claim 18, wherein said medium is a continuous porous mat having a thickness of about 1–2 mm.

26. A phenolic foam composite forming an insulating panel, said composite comprising first and second oppositely disposed skins of corrugated kraft paper having inwardly facing corrugations and a core of phenolic foam material therebetween, and first and second porous mats of reinforcement material located between said foam core and the respective corrugations of said skins, said foam extending through the pores of each said mat and bonding to said reinforcement material and to the corrugations of each said kraft paper skin.

27. A closed cell phenolic foam composite forming an insulating panel, said composite comprising first and second oppositely disposed skins of corrugated kraft paper having inwardly facing corrugations and a core of closed cell phenolic foam therebetween, and first and second layers of particulate material at each interface between said corrugations and said foam, said foam extending between the particles of said material and bonding to said particles and to the corrugations of each said kraft paper skin.

28. A phenolic foam composite as claimed in claim 26, wherein each said porous mat is wadding paper or a low density flexible urethane foam.

29. A phenolic foam composite as claimed in claim 27, wherein said reinforcement material is sawdust.

30. A phenolic foam composite as claimed in claim 28, wherein each said porous mat has a thickness of about 2 mm.

31. A phenolic foam composite as claim in claim 29, wherein each said sawdust layer has a thickness of about 2 mm.

32. A phenolic foam composite as claimed in claim 26, wherein each said continuous porous mat is perforated at selected intervals to provide additional communication between said foam and each said skin.

33. A phenolic foam composite as defined in claim 18, wherein said continuous porous mat is provided on its surface adjacent said foam material with anchor points for said foam, said anchor points being secured to said mat and providing locally increased adhesion between said foam and said mat.

34. A phenolic foam composite as defined in claim 33, wherein said anchor points are small pieces of material selected from cellulosic felt, Velcro, perforated beadboard, closed cell phenolic foam and epoxy or catalysed resin adhesive.

35. A foam composite as defined in claim 1, wherein said foam is selected from a closed-cell phenolic foam, an open-celled phenolic foam, urethane and polyisocyanurate foams.

36. A foam composite as defined in claim 9, wherein said foam is selected from a closed-cell phenolic foam, an open celled phenolic foam, urethane and polyisocyanurate foams.

37. A foam composite as defined in claim 10, wherein said foam is selected from a closed-cell phenolic foam, an open celled phenolic foam, urethane and polyisocyanurate foams.

* * * * *